M. ADAMSKI.
TROLLEY.
APPLICATION FILED APR. 25, 1913.
1,083,047.
Patented Dec. 30, 1913.
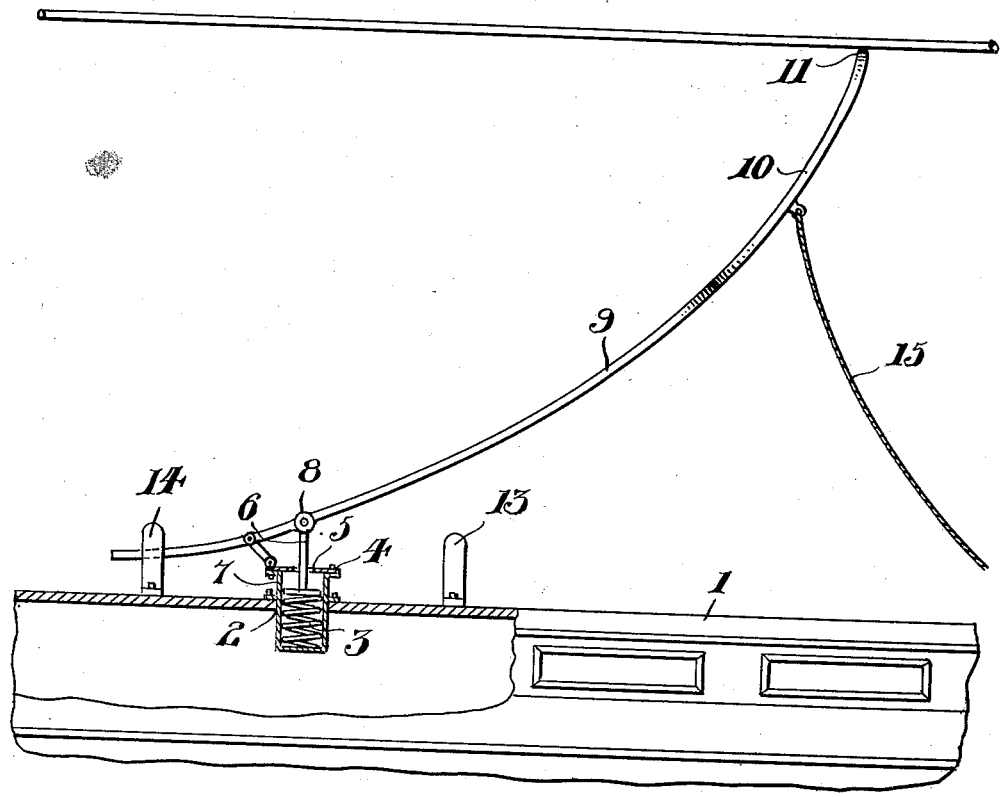
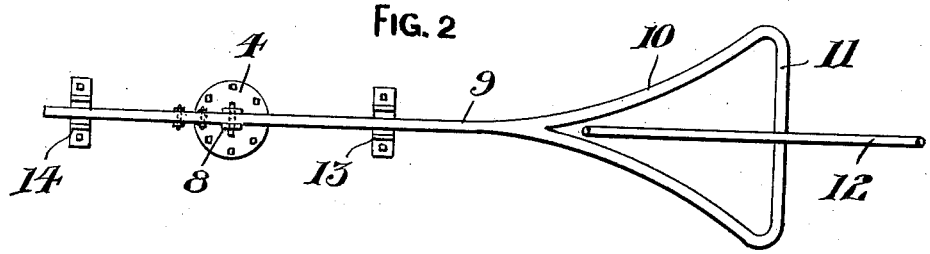
WITNESSES
INVENTOR
M. Adamski
ATTORNEY

UNITED STATES PATENT OFFICE.

MARTIN ADAMSKI, OF STONEBORO, PENNSYLVANIA.

TROLLEY.

1,083,047.  Specification of Letters Patent.  Patented Dec. 30, 1913.

Application filed April 25, 1913.  Serial No. 763,514.

*To all whom it may concern:*

Be it known that I, MARTIN ADAMSKI, a subject of the Emperor of Austria-Hungary, residing at Stoneboro, in the county of Mercer and State of Pennsylvania, have invented certain new and useful Improvements in Trolleys, of which the following is a specification, reference being had therein to the accompanying drawing.

This invention relates to trolley poles, and more particularly to that type provided with means in a manner as hereinafter set forth, wherein a wide contact surface is provided for engaging a trolley wire, rail or electric conductor.

The object of my invention is to provide a simple, durable and inexpensive trolley pole having a triangular-shaped head that is held normally in engagement with a trolley wire by a novel device located in the roof of a car or vehicle.

I attain the above and other objects by a mechanical construction that will be hereinafter specifically described and then claimed, and reference will now be had to the drawing, wherein:—

Figure 1 is a side elevation of a trolley pole in accordance with this invention, and Fig. 2 is a plan of the same.

Further describing my invention in detail with reference to the accompanying drawing, wherein like numerals denote corresponding parts throughout: 1 denotes, by the way of an example, the roof of a street car and mounted in the roof 1 is a cylinder or pot 2 containing a coiled compression spring 3. The pot 2 is closed by a detachable plate 4 having a central opening 5 for a piston 6. The inner end of the piston 6 has a head 7 engaging the coiled compression spring 3 and the outer end of the piston is bifurcated and pivotally connected by a pin 8 to a curved trolley pole 9. The upper end of the pole 9 has a triangular-shaped head 10 that presents a wide contact surface 11 for engaging a trolley wire 12 or other electric conductor.

To prevent the trolley pole from swinging sidewise relatively to the roof of the car, the roof is provided with guides or uprights 13 and 14, the latter receiving the lower end of the trolley pole and the former receiving said pole when the pole is lowered through the medium of a cord 15, attached to said pole.

From the foregoing it will be observed that the dash pot yieldably supports the trolley pole and that the spring within the dash pot is of sufficient tension to hold the head of the pole in engagement with the wire 12, and the car can safely pass around a curved section of wire or move with considerable rapidity without any danger of the electric operating circuit being broken by a displaced trolley.

One embodiment of the invention has been illustrated but it is to be understood that the structural elements are susceptible to such variations and modifications as fall within the scope of the appended claim.

What I claim is:—

A trolley comprising a cylinder adapted to be secured to the roof of a car, a spring arranged therein, a piston mounted on said spring, a piston rod secured to said piston and projecting from said cylinder, a trolley pole including a triangular-shaped head providing a broad bearing surface for the trolley wire, said pole curving from its lower to its upper terminus, means for pivotally connecting the pole and said rod in proximity to the lower terminus of the pole, and guides adapted to be secured to the roof of a car and associated with said pole.

In testimony whereof I affix my signature in the presence of two witnesses.

MARTIN ADAMSKI.

Witnesses:
S. FIEDNAN,
JOHN KELLY.

*Copies of this patent may be obtained for five cents each, by addressing the "Commissioner of Patents, Washington, D. C."*